March 17, 1970  A. H. PARMENTIER  3,501,003
METHOD FOR RECOVERING THE SOLID FROM A CLOGGING SLURRY, MORE
PARTICULARLY IRON OXIDE SLURRIES IN STEELWORKS
Filed March 17, 1967  2 Sheets-Sheet 1

United States Patent Office 3,501,003
Patented Mar. 17, 1970

3,501,003
METHOD FOR RECOVERING THE SOLID FROM A CLOGGING SLURRY, MORE PARTICULARLY IRON OXIDE SLURRIES IN STEELWORKS
Alfred Henri Parmentier, 3 La Bruyere, Lillois, Brabant, Belgium
Filed Mar. 17, 1967, Ser. No. 623,910
Claims priority, application Luxemburg, Mar. 21, 1966, 50,703; Jan. 24, 1967, 52,865
Int. Cl. B01d *37/02, 33/24*
U.S. Cl. 210—67    7 Claims

ABSTRACT OF THE DISCLOSURE

A method for recovering a solid from a slurry comprises depositing a foundation dust layer on a flat table rotating in a horizontal plane and forming a second, thin layer of dust on the foundation layer by depositing an aqueous suspension of the dust onto the foundation layer. A slurry is then deposited onto the second, thin layer and the solids in the slurry settle more quickly than the filter of the liquid so that a third layer of solids from the slurry is formed on the second thin layer while a clear filtrate forms on the surface of the third layer. The clear filtrate is removed and the third layer is dried, whereafter the second and third layers are removed together while leaving the foundation layer in place. The second and third layers are then mixed together after their removal.

---

My invention relates to a method of recovering a solid from a clogging slurry. In general, the recovery of a solid from a clogging slurry calls for a difficult filtering operation. Fine solid passes through the filter tissue. The filtrates are not clear until a deposited layer acts as a filtering medium. At that moment the solid clogs the tissues. After filtration the solid is pasty and difficult to handle and use.

The problem of recovery arises in many industries, for instance the recovery of iron oxide from steelworks slurries, fine slurries and fine schists in coal processing, clay from water in which quarry blocks have been washed, and minerals in flotation or enrichment waters.

To facilitate the explanation, steel-making will be taken as an example. The gases leaving converters at steelworks entrain fine dusts of iron oxide which are washed with water in scrubbers. The oxide suspension is then thickened in decanters which produces a clogging slurry. In the prior art techniques, the slurry is filtered on rotary drums with the disadvantages stated above. The unclear filtrates are returned to the decanters, so that cycling takes place with the fine oxide. The filtered oxide is a paste containing 25–30% water and cannot be transported by the conventional means (screws, belts or elevators) and cannot be stocked in a hopper.

To recover the oxide as iron ore, the paste is either dried by mixing with a sufficient quantity of quicklime (this being a troublesome method which cannot be used if the materials employed at the steelworks are rich in limestone) or else the paste can be dried by heating. It solidifies in conventional dryers; special apparatuses must be used. The cost of heating is high.

The iron oxide thus treated is recovered in agglomeration (iron and steel industry) with the following raw materials: iron ores, blast furnace dust, coke dust, limestone flux; these will be referred to hereinafter as *dusts*.

The aforementioned treatments have been found to be necessary, although they are complicated and expensive, to enable the oxide to be transported from the steelworks to agglomeration and to enable it to be readily mixed with the dusts. It is difficult to mix a charge of pasty oxide with a charge of dust by means of a mixing apparatus. Moreover, the oxide rejects its water to the surface by thixotropic effects because of the long duration required by mixing. The mixture can therefore no longer be transported by industrial devices nor can it be stocked.

It is an object of the method according to the invention to obviate the aforementioned disadvantages of mixing in charges, and to perform a rapid mixing of the oxide and one or more dusts, and to eliminate all treatment other than filtration and mixing.

To this end, the method according to the invention is mainly characterized in that the solid is recovered exclusively by filtering and mixing operations to obtain a product which can be transported, stocked and used, by the slurry being spread out in thin parallel layers interpenetrated with the solid and one or more layers of dust, and either one thin layer of solid is filtered on a thin layer of dust, whereafter the two layers are extracted and homogenizing mixing is performed, or the slurry alone is filtered, whereafter thin layers of the filtered solid and one or more layers of dust are simultaneously rolled and finally mixed.

It is known that clogging slurries are filtered on a preliminary layer of fine grain size (kieselguhr-asbestos). Its upper portion is penetrated by the solid and must be removed together therewith. After some time the preliminary layer has disappeared. Filtration must be stopped to renew it. On a drum it would be difficult to form a preliminary layer with the dust, in view of the latter's density. It is impossible to renew the removed portion of the preliminary layer as filtration continues. The penetration of the oxide into a preliminary layer of dust is important, in view of the coarse grain size of the latter. The whole of the preliminary layer would be removed after a few rotations of the drum.

The method according to the invention comprises the continuous filtering of two thin layers on a third supporting layer. The filtration can be performed only on a horizontal rotary table, in view of the three layers successively used. The invention obviates the aforementioned disadvantages, since it allows the layer of dust acting as a preliminary layer to be renewed without the filtration being stopped, it allows clear filtrates to be obtained, and it enables the oxide and the layer to be brought together in thin parallel layers which have already interpenetrated one another, thus allowing rapid homogenization affording the aforementioned advantages.

The invention will now be described in greater detail with reference to two exemplary embodiments thereof with reference to the accompanying drawing, wherein.

Figure 1:
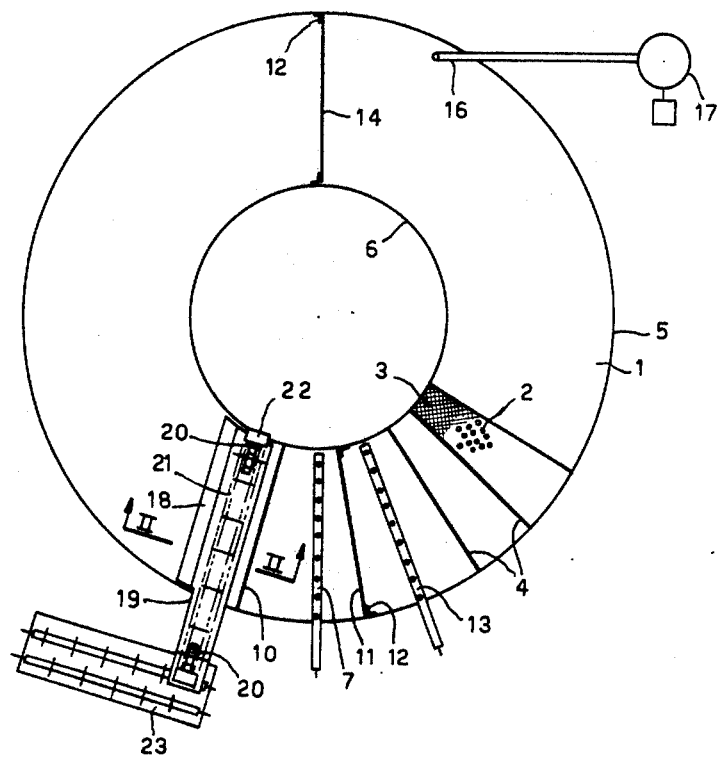
FIG. 1 is a plan view of a rotary filter table having the necessary devices for the performance of the method according to the invention.
Figure 2:
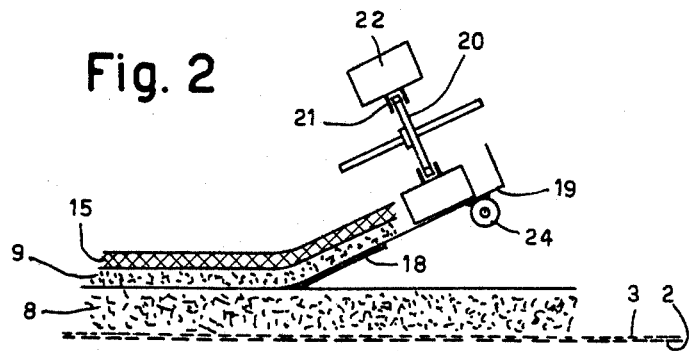
FIG. 2 is a section in elevation, taken along the line II—II in FIG. 1.

Referring to FIGS. 1 and 2, filtration is performed on a rotary table 1 whose filter surface, formed by perforated sheets 2 of metal covered with filter tissue 3, rotates in a horizontal plane. The table 1 is divided into sectors by partitions 4 (only several of which are shown) connecting the filter surface to the ends of the sectors. The table 1 bears an external edge 5 and an internal edge 6 co-operating with the filter surface to form a basin receiving the products for treatment. Before continuous operation starts, an aqueous suspension of one or more dust constituents is fed by a pipe 7 over the whole filter surface and is filtered to form a foundaon layer 8 acting as a long term support. Its thickness is regulated by the action of an extracting blade to be escribed hereinafter. A second thin layer of dust 9 is roduced by continuously feeding an aqueous suspension thereof from the same pipe 7 onto the first layer . The second layer 9 must have a thickness greater 1an the depth of penetration of the oxide to be filtered n the layer 9.

This thin layer 9 is rapidly filtered. The filtration is erformed over a small portion of the filter surface ounded upstream by a fixed barrier 10 made of resilent material and downstream by a levelling blade 11 which horizontally levels the thin layer deposited and lso acts as a barrier. Its ends have strips 12 of a resilent material to provide sealing-tightness against the able edges. After the dust has been filtered and levelled, he steel-works slurry is continuously fed through a pipe 3 and filtered in a zone bounded downstream by a evelling blade 14 identical with the levelling blade 11 nd performing the same functions. The slowly filtering slurry deposits a thin layer 15 of iron oxide on ayer 9. This filtration on the second layer, acting as filtering medium, produces *clear* filtrates. During this low filtration on a horizontal surface, the oxide settles nore quickly than the liquid filters. At some distance rom the pipe 13 clear liquid floats on the surface. It s removed, without having to be filtered, by the suction f sucking tubes 16 put under negative pressure by a ucking machine via a separator 17. After the layers ave been levelled by the blade 14 they are dried.

On completion of drying, the second thin layer 9 and he third thin layer 15 are extracted together, the first ayer 8 remaining intact. To this end, a fixed inclined xtracting blade 18 cuts at the separation between the ayers 8, 9 by the rotation of the table which also pushes he layers 9, 15 on to the apron 19 in the direction of lateral evacuation transporter. The latter comprises it its ends two toothed wheels 20, one of which is moved t a variable speed by a suitable control member (not hown). The wheels 20 turn a chain 21 on which scrapng vanes 22 are mounted to carry the thin layers out f the filter. The layers are then rapidly homogenized n a mixer 23.

Each levelling blade is a rigid blade mounted on a adial horizontal rotary shaft which enable the blade o be inclined to control the height of the layer deposited. The shaft can also move in the horizontal plane so that he correct place can be selected for the levelling of the ayer. The cutting edge of the extracting blade can be egulated a short distance from the filter tissue for the periodic renewal of the layer 8, or at the required height o regulate the thickness of the layer 8. To this end, he extracting blade 18, the apron 19 and the lateral conveyor form an assembly rotating around a single axis 24. The two thin layers can also be extracted continuously at the height of the supporting layer, or the hree layers can periodically be extracted on the renewal of the supporting layer. The suckers for the liquid decanted on to the filter are one or more tubes subjected to negative pressure and immersed in the liquid. Since he withdrawn liquid must not be filtered, filtering surface is saved.

The dust and oxide extracted from the filter are rapidly mixed, the products being brought into one another's presence in thin parallel layers which have already interpenetrated one another. Homogenization can readily be performed.

A mixture which can be transported, stocked and used can also be produced in conventional manner from the oxide of the filter slurry alone, by the application of the principle of thin layers. However, it is clear that the aforementioned disadvantages continue to exist for filtration on a rotary drum.

In a second embodiment of the invention, filtered solid in thin layers for further use is rapidly mixed by simultaneously rolling with valuable dust. The two layers interpenetrate one another as a result of the rolling.

Figure 3:
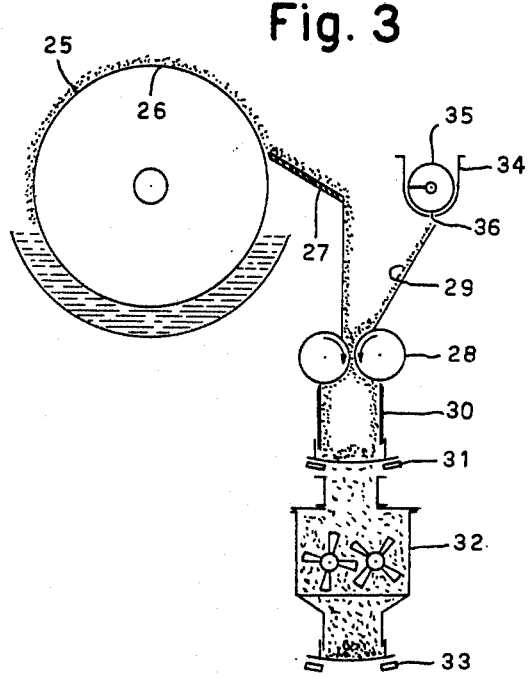
FIG. 3 is an overall elevation of a second embodiment of the invention.
Figure 4:
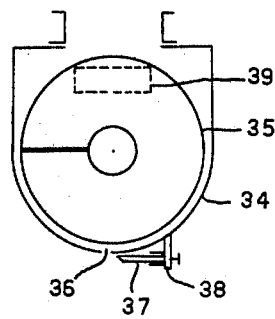
FIG. 4 is a section in elevation through an advantageous device for distributing the dust in a thin layer.

Referring to FIGS. 3 and 4, iron oxide 25 is obtained by filtration on a drum filter 26 from which it is removed by a scraper 27. The oxide is rolled in a thin layer between two rotary cylinders 28, preferably having a length at least equal to that of the drum. Simultaneously dust is fed in the form of a thin layer 29 at the top and over the length of the cylinders. A mixture is formed by the interpenetration of the two thin layers. Blades 30 scrape the mixture, which drops on to the conveyor 31 taking it to a mixer 32. The homogenised mixture is evacuated by a conveyor 33. The mixture can be transported, stocked and used as it is in agglomeration. Cylinders for rolling a pasty product into a thin layer are known in industry. A hopper having a narrow elongated outlet with a vibrating flap or a wide conveyor belt can be used to distribute the dust in a thin layer. These devices are impracticable because of the length of the rolling cylinders which the devices must regularly feed. A conventional Archimedean screw generally transports the dust to an unloading point, but it is unsuitable for distribution in an elongated thin layer. The following improvement enables it to perform this function.

A trough 34 receiving the screw 35 is formed in its lower portion and over its length with an oblong aperture 36 which distributes the dust. It is closed at the required quantity by the lateral movement of a baffle 37 activated by a screw and flywheel 38. The baffle 37 can be divided up into a number of distinct elements. The width and shape of the aperture can be regulated. To maintain a uniform level of dust in the trough, the excess dust emerges via an orifice 39 in the vertical front or side wall on the side opposite to that where the screw is fed.

Clearly, modifications could be made to the constructional technique and the devices described hereinbefore without exceeding the scope of the invention.

In a similar manner to that explained for steelwork slurries, the following can be filtered in superimposed thin layers or laminated together into thin layers, then homogenised.

Fine slurry of coal mining muds with granular slurry used as a dust; fine schist from coal-washing plant, with coarser schist;

Clay from the water in which quarry blocks have been washed, with crushed limestone; flotation or enrichment fines of minerals, with pulverulent mineral; in general, any solid from a clogging slurry, with dust with which the solid can subsequently be used.

What I claim is:

1. A method for recovering a solid from a slurry, said method comprising: depositing a foundation dust layer of coarse grain material on a filter table rotating in a horizontal plane; depositing dust of coarse grain material in aqueous suspension on the foundation layer whereby the dust in the suspension is filtered and forms a second layer of dust on the foundation layer; feeding a slurry onto said second layer whereby said slurry is filtered producing clear filtrates and a third layer of solids, some solids in said slurry settling more quickly than the slurry filters, clear liquid forming on the surface of said third layer; removing said clear liquid; drying said third layer; and thereafter removing the second and third layers while leaving the foundation layer in place.

2. A method as claimed in claim 1 wherein said second layer is relatively thin compared to the foundation layer.

3. A method as claimed in claim 2 wherein said second layer of dust is formed to a thickness greater than the depth of penetration thereinto of the solids of the third layer.

4. A method as claimed in claim 1 wherein said clear liquid is removed by suction and said third layer is dried by filtration, the removed second and third layers being combined for subsequent use together.

5. A method as claimed in claim 1 wherein said second and third layers are mixed together after their removal.

6. A method as claimed in claim 1 wherein the dust of the second layer is progressively deposited along the length of the foundation layer and the slurry is successively applied onto the second layer.

7. A method as claimed in claim 1 wherein the foundation layer is of annular form and both the dust of the second layer and the slurry are successively deposited onto the foundation layer while the table rotates.

References Cited

UNITED STATES PATENTS

| | | | |
|---|---|---|---|
| 1,150,263 | 8/1915 | Godbe | 210—396 X |
| 2,576,288 | 11/1951 | Fink et al. | 210—193 X |
| 2,604,995 | 7/1952 | Maslin | 210—396 |

SAMIH N. ZAHARNA, Primary Examiner

U.S. Cl. X.R.

210—68, 75, 77